United States Patent
Katae et al.

[11] Patent Number: 6,108,179
[45] Date of Patent: *Aug. 22, 2000

[54] EMERGENCY SHUT-DOWN APPARATUS FOR MOTOR

[75] Inventors: Tohru Katae; Takafumi Ishikawa; Tatsuhiko Furukawa, all of Nagoya, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/027,203

[22] Filed: Feb. 20, 1998

[30] Foreign Application Priority Data

Oct. 3, 1997 [JP] Japan .................................. 9-271731

[51] Int. Cl.⁷ .................................................. H01H 47/22
[52] U.S. Cl. .............................. 361/31; 361/33; 361/170; 307/139; 307/140
[58] Field of Search .................................. 361/23, 31, 33, 361/160, 166, 167, 170, 187; 307/112, 139, 140, 116; 318/452, 563

[56] References Cited

U.S. PATENT DOCUMENTS

| | | | |
|---|---|---|---|
| 3,581,179 | 5/1971 | Jones | 318/452 |
| 5,214,311 | 5/1993 | Kageyama et al. | 307/18 |
| 5,444,342 | 8/1995 | Matsuo et al. | 318/563 |
| 5,689,398 | 11/1997 | Miller et al. | 361/189 |

FOREIGN PATENT DOCUMENTS 64-1491  5/1989  Japan .

*Primary Examiner*—Jeffrey Gaffin
*Assistant Examiner*—Kim Huynh
*Attorney, Agent, or Firm*—Sughrue, Mion, Zinn, Macpeak & Seas, PLLC

[57] ABSTRACT

Emergency shut-down circuit is provided for a multiplexed circuit. The emergency shut-down circuit includes a plurality of contacts arrayed in parallel to each other and which are synchronously opened and closed. A plurality of electromagnetic contactors are operated according to a open or closed state of each of the plurality of emergency shut-down switches and are connected in series to a main circuit power circuit for a motor.

15 Claims, 15 Drawing Sheets

61~66

EMERGENCY SHUT-DOWN APPARATUS FOR MOTOR

FIELD OF THE INVENTION

The present invention relates to an emergency shut-down apparatus for a motor in robots, machine tools, and various types of industrial machine or the like, and more particularly to an emergency shut-down apparatus which can shut down a motor without fail even when contacts of an emergency shut-down switch are short-circuited or even when a cable connecting a switch, a relay or the like thereto is disconnected.

BACKGROUND OF THE INVENTION

FIGS. 13A and 13B each show a control unit for a motor such as a motor for driving a robot including an emergency shut-down circuit based on the conventional technology. FIG. 13A shows a power circuit (main circuit power circuit) for driving a motor 1 for driving a robot or the like, and a three-phase power supply unit 2 for the main circuit. The three-phase power supply unit 2 supplies a three-phase AD current via an electromagnetic contactor (MC1) 3 and an amplifier 4 to the motor 1.

FIG. 13B shows a coil energizing circuit for the electromagnetic contactor (MC1) 3. This coil energizing circuit has contacts 5a, 6a, 7a of for a plurality of emergency shut-down switches 5, 6, 7 each based on a push-button system and a switching transistor 9 with the base current controlled by a servo control section 8 connected thereto in series with a coil 3a of the electromagnetic contactor (MC1) 3.

It should be noted that the emergency shut-down switch 5 is an external emergency shut-down switch, which is used by a robot user to stop operations of the robot in an emergency even from a location which is remote from a basic body of the robot or the control unit, and the wiring thereto is short-circuited and returned to a robot control unit, if unnecessary. The emergency shut-down switch 6 is an emergency shut-down switch provided, for instance, on an operation panel, and the emergency shut-down switch 7 is an emergency shut-down switch on a remote control box (teaching box).

When the servo control section 8 flows a base current through the switching transistor 9 in the state where all the emergency shut-down switches 5 to 7 have not been pressed down and all the contacts 5a, 6a, 7a are in the connected state, the switching transistor 9 flows a collector current due to the base current to be turned ON and an exciting current for a coil 3a of the electromagnetic contactor 3 flows between the collector and the emitter. With this operation, the electromagnetic contactor 3 makes the contact operation from the disconnected state to the connected state, and electrical continuity between the three-phase power supply unit 2 and the amplifier 4 is established with the main circuit power voltage loaded to the motor 1 and the motor 1 driven.

In the state as described above where the motor 1 is being driven, if any of the emergency shut-down switches 5 to 7 is pressed, any of the contacts 5a, 6a, 7a corresponding to the pressed switch is set in the disconnected state, and power supply to the coil 3a of the electromagnetic contactor 3 is stopped irrespective of the operating state of the switching transistor 9 with the electromagnetic contactor 3 operated from the disconnected state to the connected state. With this operation, power supply of main circuit power for the motor 1 is disconnected with the motor 1 shut-down.

FIG. 14 shows an emergency shut-down circuit for industrial machines such as robots disclosed in Japanese Patent Laid-Open Publication No. SHO 64-1491. It should be noted that, in FIG. 14, the same reference numerals are assigned to the same components as those shown in FIG. 13 and description thereof is omitted herein.

The emergency shut-down circuit has normally open contacts 11a, 12a, 13a, 14a of electromagnetic relays R11 to R14 provided in power circuits of the motors and only when both the normally open contacts A 15a, 16a of the electromagnetic relays R15, R16 are in the closed state, a DC current is supplied from the control power supply unit 17.

Supplied to coils 15c, 16c of the electromagnetic relays R15, R16 is a DC current via a circuit comprising the emergency shut-down switches 5, 6 and an emergency shut-down circuit formed in a CPU 18 for servo control connected serially to each other, a circuit comprising normally closed contacts 15b, 16b of the electromagnetic contractors R15, R16 and normally closed contacts 11b to 14b of the electromagnetic relays R11 to R14 serially connected to each other, and another normally open contact A (self-sustaining contacts) 15a', 16a' from the control power supply unit 17.

It should be noted that an emergency shut-down release switch 20 for releasing shut-down by the emergency shut-down circuit 19 is connected to the CPU 18.

When set or reset (in the state where all the coils 11c to 16c of the electromagnetic relays R11 to R16 are OFF) for starting, if contacts of the emergency shut-down switches 5, 6 are connected and the emergency shut-down circuit 19 is connected according to an operation of the emergency shut-down release switch 20, a DC current is supplied from the control power supply unit 17 via the emergency shut-down switches 5, 6, emergency shut-down circuit 19, normally closed contacts 15b, 16b of the electromagnetic relays R15, R16, and normally closed contacts 11b to 14b of the electromagnetic relays R11 to R14 to the coils 15c, 16c of the electromagnetic relays R15, R16.

With this operations, both the normally open contacts 15a, 16a of the electromagnetic relays R15, R16 are set in the closed state, a DC current from the control power supply unit 17 is supplied to the coils 11c to 14c of the electromagnetic relays R11 to R14 with the normally open contacts 11a to 14a closed, and a main circuit power current is supplied to the driving circuit 10 of the motor 1. When the coils 11c to 14c of the electromagnetic relays R11 to R14 are excited, the normally closed contacts B 11b to 14b of the electromagnetic relays R11 to R14 are opened, but then as the normally open contacts A 15a', 16a' of the electromagnetic relays R15, R16 for self-sustaining are set in the connected state, power supply to the coils 15c, 16c of the electromagnetic relays R15, R16 is continued, and the normally open contacts 15a, 16a and the normally open contacts 11a to 14a of the electromagnetic relays R11 to R14 are kept in the closed state.

During the operations as described above, if the emergency shut-down switch 5 or 6 is pressed by an operator, or if the emergency shut-down circuit 19 is connected due to self-detection of a failure in the CPU or other components, power supply to the coils 15c, 16c of the electromagnetic relays R15, R16 are stopped with the normally open contacts 15a, 15a', 16a, 16a' opened, and also power supply to the coils 15c, 16c of the electromagnetic relays R15, R16 is stopped with the normally open contacts 11a to 14a disconnected.

With the feature as described above, when an operator shuts down operation of a motor or operation of a motor is shut down as a result of self-detection of a failure, supply of a main circuit power to the motor 1 is disconnected, and operation of the motor 1 is shut down.

FIG. 15 shows an example of a robot control unit incorporating an emergency shut-down circuit and connected to a teaching box based on the conventional technology. A teaching box 30 for controlling a robot in a remote mode is disconnectably connected with a connector 31 to this robot control unit. The normally open contacts 21a, 21b of an electromagnetic relay R21 are connected to motor power circuits 40, 41 respectively.

Power supply to the coil 21c of the electromagnetic relay R2 is controlled by a circuit comprising a robot activating switch 43 based on a momentary switch and an emergency shut-down switch 44 of the control unit connected in series to each other as well as by a circuit comprising normally open contacts 22a, 23a of electromagnetic relays R22, R23 and normally closed contacts B 22a, 23b thereof connected in parallel to each other. It should be noted that an normally open contact 21d of the electromagnetic relay R21 for keeping the activating switch ON is provided in parallel with the robot activating switch 43.

An emergency shut-down switch 32 is provided in the teaching box 30. The emergency shut-down switch 32 is connected with terminals B1 and B2 of the connector 31 to the coil 22c of the electromagnetic relay R22 in the control unit. In the state where the emergency shut-down switch is not being operated, power supply to the coil 22c of the electromagnetic relay R22 is continued, while power supply to the coil 22c of the electromagnetic relay R22 is stopped when the emergency shut-down switch 32 is operated.

Also provided in the control unit is a coil 23c of the electromagnetic relay R23 to which power is supplied through internal short-circuit Bn terminal and Bn-1 terminal of the connector 31 into the control unit, in other words to which power is supplied because it is connected with the connector 31 to the teaching box 30.

Next description is made for operations thereof. When the robot activating switch 43 is pressed, a current is supplied through via an emergency shut-down switch 44 in the connected state and the normally closed contacts 22b, 23b of the electromagnetic relays R22, R23 to the coil 21c of the electromagnetic relay R21, with the normally open contacts 21a, 21b thereof closed and the motor power circuits 40, 41 connected thereto. This state is maintained because the normally closed contact 21d of the electromagnetic relay R21 is closed, even after the robot activating switch 43 is released from the pressed state.

In the operating state as described above, when the emergency shut-down switch 44 in the control unit is pressed, power supply to the coil 21c of the electromagnetic relay R21 is stopped, so that the always-disconnected contacts 21a, 21b, 21c are switched from the closed state to the open state, and power for the motor is disconnected because the motor power circuits 40, 41 are disconnected, thus operation of the motor being shut down.

Also, when the emergency shut-down switch 32 of the teaching box 30 is pressed in the operating state as described above, as power supply to the coil 22c of the electromagnetic relay R22 is stopped, so that the always-disconnected contact 22a is switched from the closed state to the open state with the always-connected contact B 22b switched from the open state to the closed state. In contrast, as the always-disconnected contact 23a of the electromagnetic relay R23 is kept in the closed state and the always-connected contact 23b thereof kept in the open state, power supply to the coil 21c of the electromagnetic relay R21 is stopped with the always-disconnected contacts 21a, 21b, 21c switched from the closed state to the open state, and also power for the motor is disconnected because the motor power circuits 40, 41 are disconnected, thus operation of the motor being stopped.

Also in the operating state as described above, if a jumper line for the connector 31 is removed, as power supply to the coil 23c of the electromagnetic relay R23 is stopped, so that the normally open contact 23a thereof is switched from the closed state to the open state with the normally closed contact 23b switched from the open state to the closed state. In contrast, as the normally open contact A 22a of the electromagnetic relay R22 is kept in the closed state with the normally closed contact 22b kept in the open state, so that power supply to the coil 21c of the electromagnetic relay R21 is stopped with the normally open contacts 21a, 21b, 21c thereof switched from the closed state to the open state, and also the motor power circuits 40, 41 are disconnected, so that power for the motor is disconnected and the motor is shut down.

In the emergency shut-down circuit in any of the examples of conventional technology described above, when contacts of an emergency shut-down switch are short-circuited due to any failure, the emergency shut-down switch does not work effectively even if an operator operates the emergency shut-down switch in an emergency, namely the contacts of the emergency shut-down switch are not disconnected with the motor power not shut down, and the state where a main circuit power voltage is being loaded to the motor is continued, and emergency shut-down is not effected, which is disadvantageous.

Also, there has not been any means enabling an operator to locate, when there occurs any fault, the faulty section.

SUMMARY OF THE INVENTION

It is an object of the present invention to provide an emergency shut-down apparatus which can shut down operation of the motor without fail even when contacts of the emergency shut-down switch are short-circuited due to any failure or even when a cable connected switches, relays or the like are broken, and also can prevent a power voltage from being loaded again to the motor when any fault such as a failure occurs, and further which makes it possible for a user to locate the faulty section.

With the emergency shut-down apparatus for a motor according to the present invention, the emergency shut-down switch comprises a switch for a multiplexed circuit having a plurality of contacts arrayed in parallel to each other and working with the same phase of disconnection and connection, and a plurality of electromagnetic contactors each opened or closed according to disconnection or connection of each of said a plurality of emergency shut-down switches are connected in series to a main circuit power circuit for the motor, so that, even if one of the two contacts of an emergency shut-down switch is short-circuited or a cable or the like connected thereto is broken, the emergency shut-down switch works effectively because of the other contact, so that an operator can stop operation of the motor according to the operator's will.

Other objects and features of this invention will become understood from the following description with reference to the accompanying drawings.

DESCRIPTION OF THE PREFERRED EMBODIMENTS

Figure 1A:
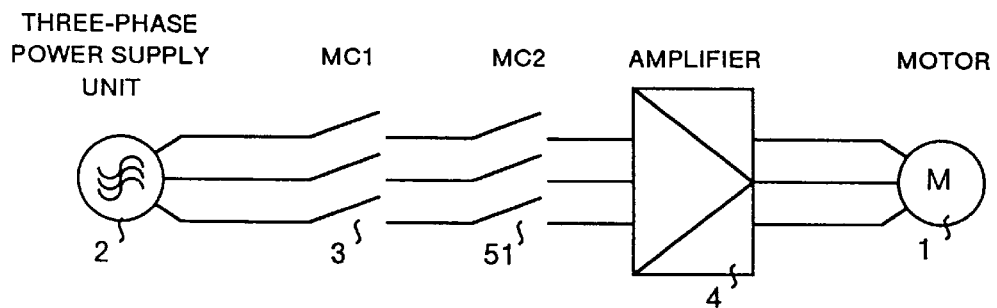
FIG. 1A to FIG. 1C are views showing a power circuit for driving a motor, a coil power circuit for an electromagnetic contactor, and a coil power circuit for an electromagnetic relay respectively each in an emergency shut-down apparatus for a motor according to Embodiment 1 of the present invention.

Detailed description is made hereinafter to embodiments of an emergency shut-down apparatus for a motor according to the present invention with reference to the related drawings. It should be noted that, in the embodiments of the present invention described below, the same reference numerals as those used in description of the examples of conventional technology are assigned to components having the same functions, and description thereof is omitted.

Figure 1B:
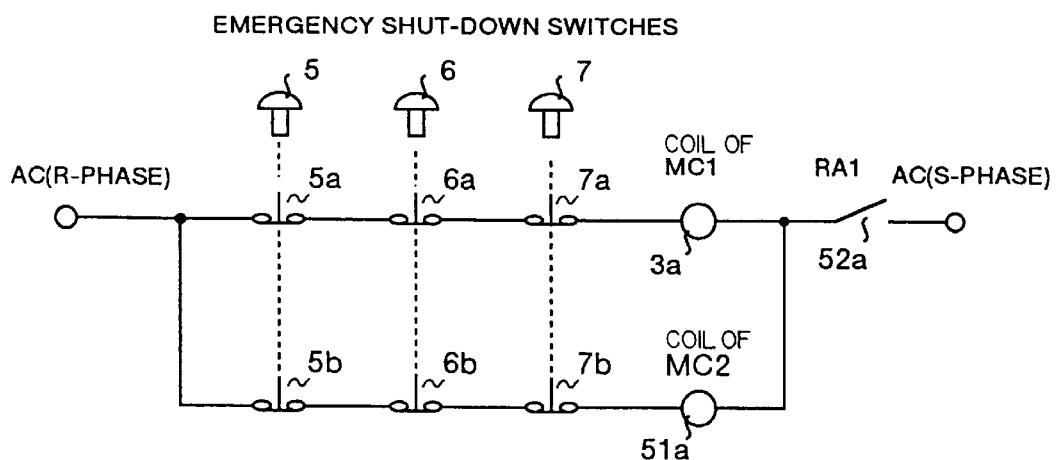
Figure 1C:
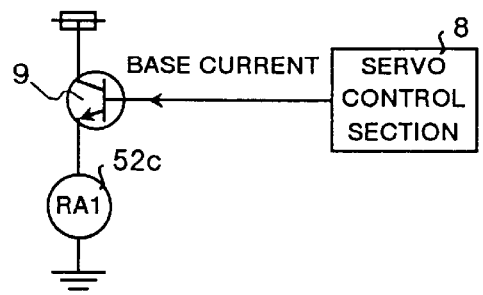

FIGS. 1A to 1C show an emergency shut-down apparatus for a motor according to Embodiment 1 of the present invention. FIG. 1A shows a power circuit for driving a motor. In this power circuit, a circuit comprising a first electromagnetic contactor (MC1) 3 and a second electromagnetic contactor (MC2) 51 connected in series to each other and an amplifier 4 are connected to a section between the motor 1 and the three-phase power supply unit 2, and the three-phase power supply unit 2 supplies a three-phase AC current via the circuit comprising the first electromagnetic contactor 3 and second electromagnetic contactor 51 connected in series to each other as well as via the amplifier 4 to the motor 1.

FIG. 1B shows a coil power supply circuit for the first electromagnetic contactor 3 and second electromagnetic contactor 51. This coil power supply circuit is a AC power circuit having a coil 3a of the first electromagnetic contactor (MC1) 3 and a coil 51a of the second electromagnetic contactor (MC2) 51 connected in parallel to each other, contacts 5a, 6a, 7a of a plurality of emergency shut-down switches 5, 6, 7 each based on a push-button system are connected in series to a circuit of the coil 3a, and another contacts 5b, 6b, 7b of said plurality of emergency shut-down switches 5, 6, 7 are connected in series to a circuit of the coil 51a, and the normally open contact A 52a of an electromagnetic relay RA1 is connected in series to the circuits.

The emergency shut-down switches 5 to 7 are two-circuit switches each having two contacts provided in parallel to each other and having the same phases for disconnection and connection, and the contacts 5a, 5b of the emergency shut-down switch 5, contacts 6a, 6b of the emergency shut-down switch 6, and contacts 7a, 7b of the emergency shut-down switch 7 are disconnected or connected with the same phase for disconnection or connection in correlation to operation of each emergency shut-down switch. For instance, when the emergency shut-down switch 5 is pressed, the contacts 5a and 5b are simultaneously set in the disconnected state.

FIG. 1C shows a coil power supply circuit for the electromagnetic relay RA1. This coil power supply circuit has a coil 52c of the electromagnetic relay RA1 provided in series to the switching transistor with the base current therefor controlled by the servo control section 8, and power supply to the coil 52c is controlled by the switching transistor 9.

Next description is made for operations thereof. When the servo controller 8 provides a base current to the switching transistor 9 in the state where all the emergency shut-down switches 5 to 7 have not been pressed and all the contacts 5a, 5b, 6a, 6b, 7a, 7b are in the connected state, the switching transistor 9 provides a collector current due to the base current to turn ON, and an exciting current to the coil 52c of the electromagnetic relay RA1 is supplied between the collector and emitter. With this, the contact 52a of the electromagnetic relay RA1 is connected and the coil 3a of the first electromagnetic contactor 3 and the coil 51a of the second electromagnetic contactor 51 are excited.

With this feature, both the first electromagnetic contactor 3 and second electromagnetic contactor 51 are switched from the disconnected state to the connected state, and as a result, electric continuity between the three-phase power supply unit 2 and the amplifier 4 is established with a main circuit power voltage loaded to the motor 1, and the motor 1 is driven.

When the motor 1 is being driven, if any of the emergency shut-down switches 5 to 7 is pressed, any of the contacts 5a, 5b, 6a, 6b, 7a, 7b corresponding to the pressed switch is set in the disconnected state, and power supply to the coil 3a of the first electromagnetic contactor 3 and the coil 51a of the second electromagnetic contactor 51 are stopped with both the first electromagnetic contactor 3 and second electromagnetic contactor 51 switched from the connected state to the disconnected state. With this operation, power supply to a main circuit of the motor 1 is disconnected with operation of the motor 1 stopped.

If any of the emergency shut-down switches 5, 6, 7, for instance, one of the contacts 5a of the emergency shut-down switch 5 is short-circuited due to some failure, even if the emergency shut-down switch 5 is operated, the contact 5a can not be set in the disconnected state, but the other contact 5b thereof is set in the disconnected state with power supply to the coil 51a of the second electromagnetic contactor 51 stopped and the second electromagnetic contactor 51 switched from the connected state to the disconnected state, so that power supply to the main circuit of the motor is stopped and operation of the motor 1 is stopped.

In this emergency shut-down apparatus, each of the emergency shut-down switches 5, 6, 7 has two contacts respectively, and even if one of the contacts is short-circuited or a cable or the like connected thereto is broken, the emergency shut-down switch works effectively because of a circuit through the other contact, so that a motor can be shut down in an emergency by an operator.

This emergency shut-down circuit is duplexed or multiplexed for fail-safe for a shut-down operation in an emergency, and because of this feature the circuit can be triplexed or duadruplexed according to the necessity, and for that purpose an emergency shut-down switch may be built with a switch for a multiplexed circuit having a plurality (3 unit, 4 units . . . ) of contacts arrayed in parallel to each other and having the same phase of disconnection and connection and also a plurality (3 units, 4 units, . . . ) of electromagnetic contractors each disconnected or connected according to disconnection or connection of each of the plurality contacts of the emergency shut-down switch arranged in series to each other may be connected to a main circuit power circuit of the motor 1.

Embodiment 2

Figure 2A:
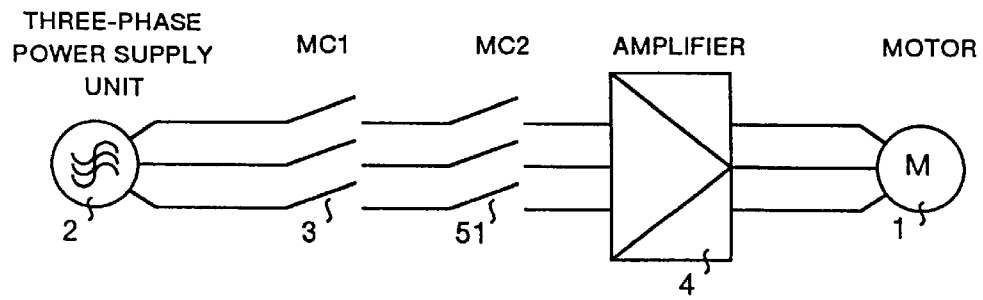
FIGS. 2A and 2B are views showing a power circuit for driving a motor and a coil power circuit for an electromagnetic relay for an emergency shut-down for a motor according to Embodiment 2 of the present invention.
Figure 2B:
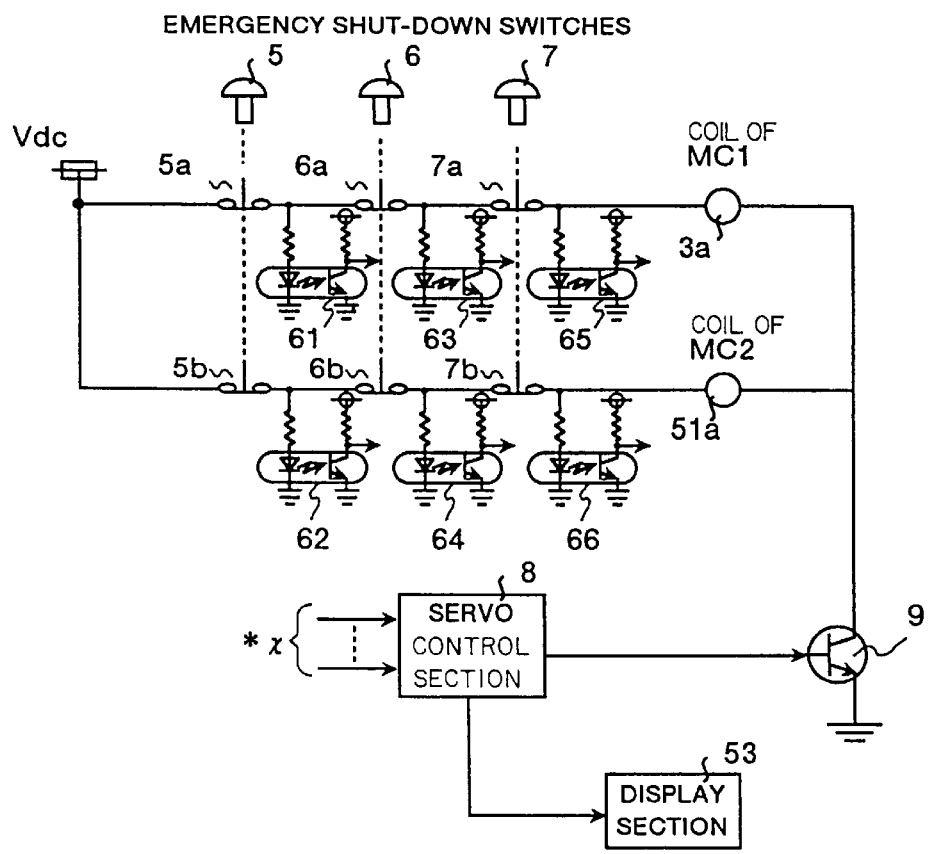

FIGS. 2A and 2B are views each showing an emergency shut-down apparatus for a motor according to Embodiment 2 of the present invention. It should be noted that, in FIGS. 2A and 2B, the same reference numerals are assigned to section corresponding to those shown in FIG. 1, and description thereof is omitted herein.

FIG. 2A is a view showing a power circuit for driving a motor. This power circuit is the same as that according to Embodiment 1 of the present invention (that shown in FIG. 1A).

FIG. 2B is a view showing a coil power supply circuit in the first electromagnetic contactor 3 and that in the second electromagnetic contactor 51. This coil power supply circuit is a DC power circuit comprising a coil 3a of the first electromagnetic contactor (MC1) 3 and a coil 51a of the second electromagnetic contactor (MC2) 51 connected in parallel to each other, and the contacts 5a, 6a, 7a of the plurality of emergency shut-down switches 5, 6, 7 each based on a push-button system are connected to a coil of the coil 3a in series, and also another contacts 5b, 6b, 7b of the emergency shut-down switches 5, 6, 7 are connected in series to a circuit of the coil 51a, and the switching transistor 9 is directly connected in series to these circuits.

It should be noted that, in this embodiment, a DC current flows in the emergency shut-down circuit comprising the contacts 5a, 6a, 7a and the coil 3a as well as in the emergency shut-down circuit comprising the contacts 5b, 6b, 7b and the coil 51a in the same direction.

Figure 3:
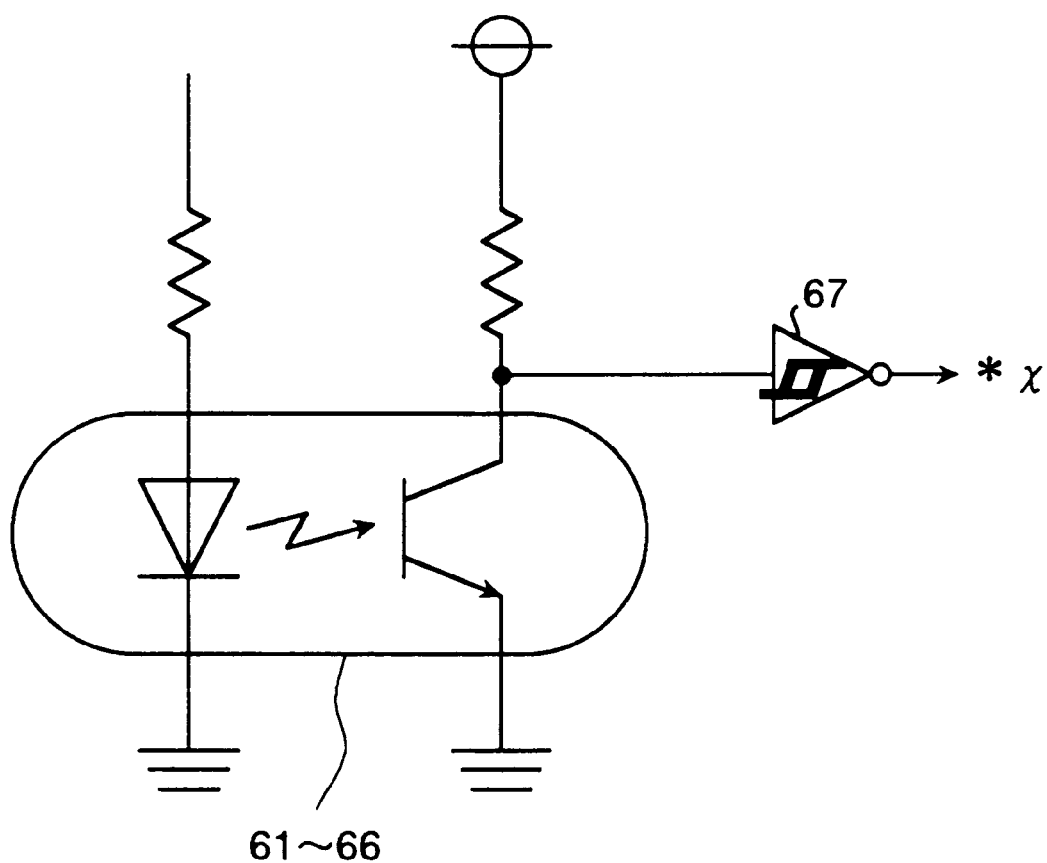
FIG. 3 is a view showing details of a signal section of a photocoupler used in an emergency shut-down apparatus according to Embodiment 2 of the present invention.

Light-emitting elements of photocouplers (contact disconnection/connection detector) 61 to 66 each for detecting whether each contact is disconnected or connected are connected in a branched form to the rear state of each of the contacts 5a, 5b, 6a, 6b, 7a, 7b of the emergency shut-down switches 5, 6, 7. The transistors in the light receiving side of the photocouplers 61 to 66 are, as shown in FIG. 3, connected to an inverter IC67 respectively, and signals from transistors in the light receiving side are inverted by the inverter IC67.

The 6 types of signal $*\chi$ ($*$ corresponds to a number of each photocoupler) are inputted into the servo control section 8, and the servo controller 8 determines in which operating state the emergency shut-down switches 5, 6, 7 are respectively (Whether each contact is in the normal state, or whether any abnormality exists or not) according to a bit of the signal $*\chi$.

Next description is made for operations thereof. If the servo control section 8 supplies a base current to through transistor 9 in the state where any of the emergency shut-down switches 5 to 7 has not been pressed and all the contacts 5a, 5b, 6a, 6b, 7a, 7b are in the connected state, the switching transistor 9 let a collector current flow according to the base current to turn ON, and an exciting current for the coil 3a of the first electromagnetic contactor 3 and the coil 51a of the second electromagnetic contactor 51 flows between the collector and emitter.

With this operation, both the first electromagnetic contactor 3 and second electromagnetic contactor 51 are switched from the disconnected state to the connected state, and as a result electric continuity between the three-phase power supply circuit 2 and the amplifier 4 is established with a main circuit power voltage loaded to the motor 1, thus the motor 1 being driven.

In the state where the motor is being driven as described above, if any of the emergency shut-down switches is pressed, any of the contacts 5a, 5b, 6a, 6b, 7a, 7b corresponding to the pressed switch is set in the open state, and power supply to the coil 3a of the first electromagnetic contactor 3 as well as to the coil 51a of the second electromagnetic contactor 51 is stopped, and both the first electromagnetic contactor 3 and second electromagnetic contactor 51 are switched from the closed state to the disconnected state. With this operation, supply of main circuit power to the motor 1 is shut down with operation of the motor 1 stopped.

Also in this embodiment, when any of the contacts of the emergency shut-down switches 5, 6, 7, for instance, the contact 5a (one of the contacts) of the emergency shut-down switch 5 are set in the short-circuited state, even if the emergency shut-down switch is operated, the contact 5a is not set in the disconnected state, but the other contact 5b is set in the disconnected state with power supply to the coil 51a of the second electromagnetic contactor 51 stopped, and the second electromagnetic contactor 51 is switched from the connected state to the disconnected state, so that supply of a main circuit power to the motor 1 is shut down, thus operation of the motor 1 being stopped.

Also in this embodiment, each of the emergency shut-down switches 5, 6, 7 has two contacts, and even if either one of the contacts is short-circuited or a cable or the like connected thereto is broken, the emergency shut-down switch works effectively with the other contact, and operation of the motor can be stopped according to the operator's will.

Figure 4:
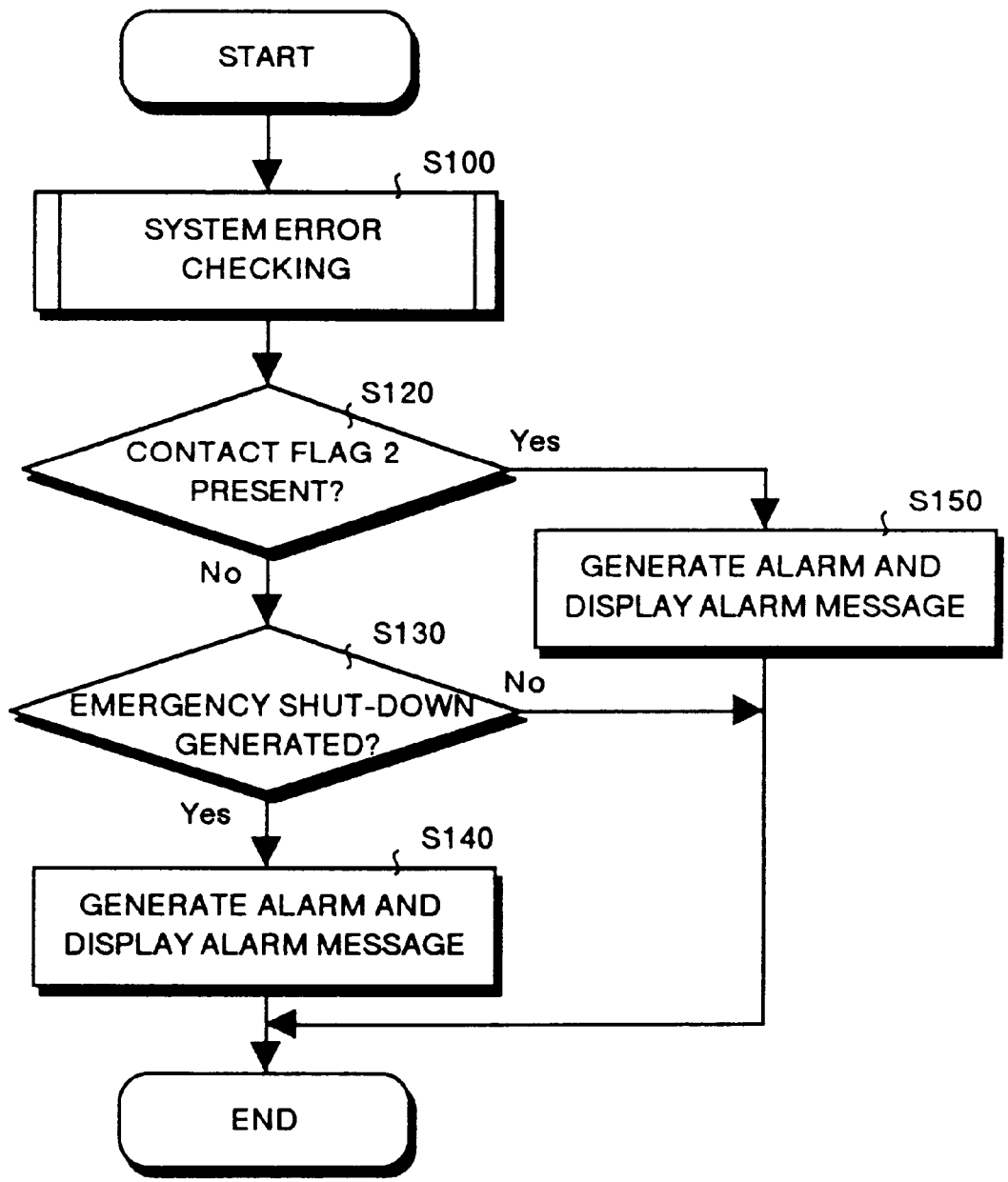
FIG. 4 is a flowchart showing the operating state display processing in the emergency shut-down apparatus according to Embodiment 2 of the present invention.
Figure 5:
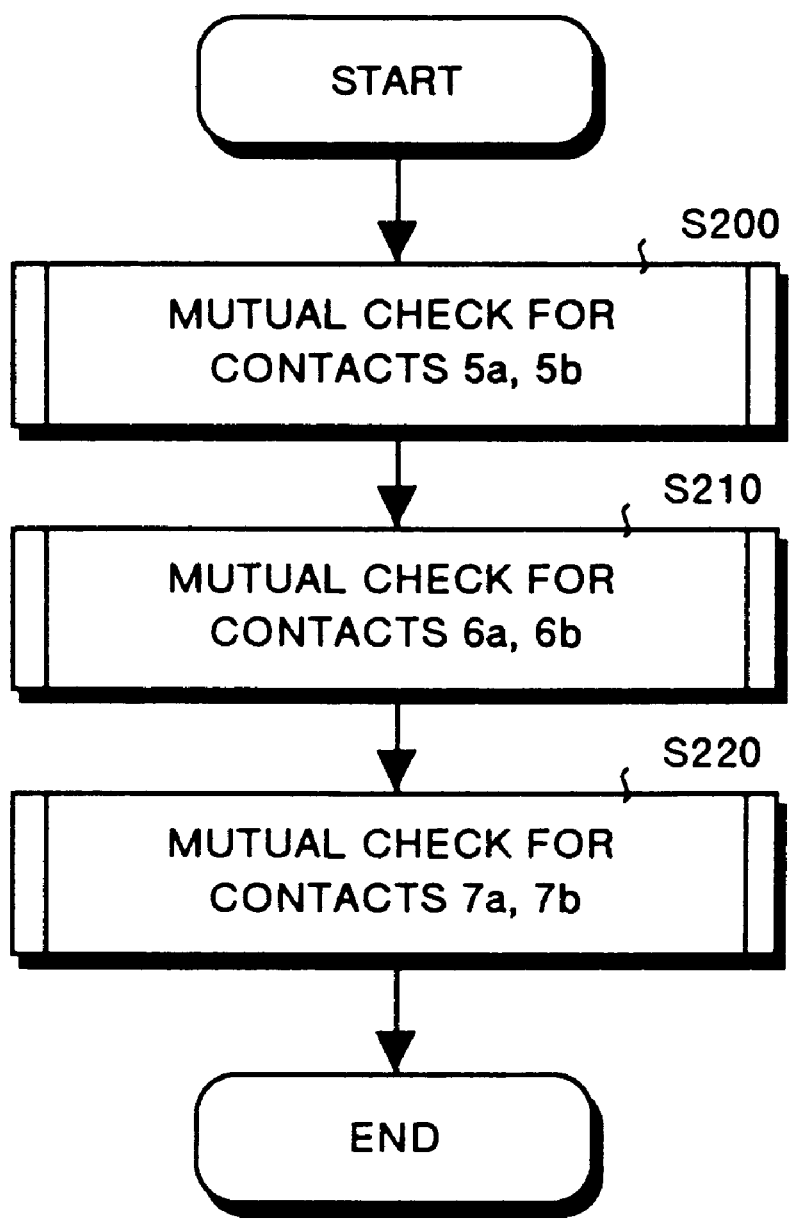
FIG. 5 is a flowchart showing a subroutine for checking abnormalities in a system in the operating state display processing.
Figure 6:
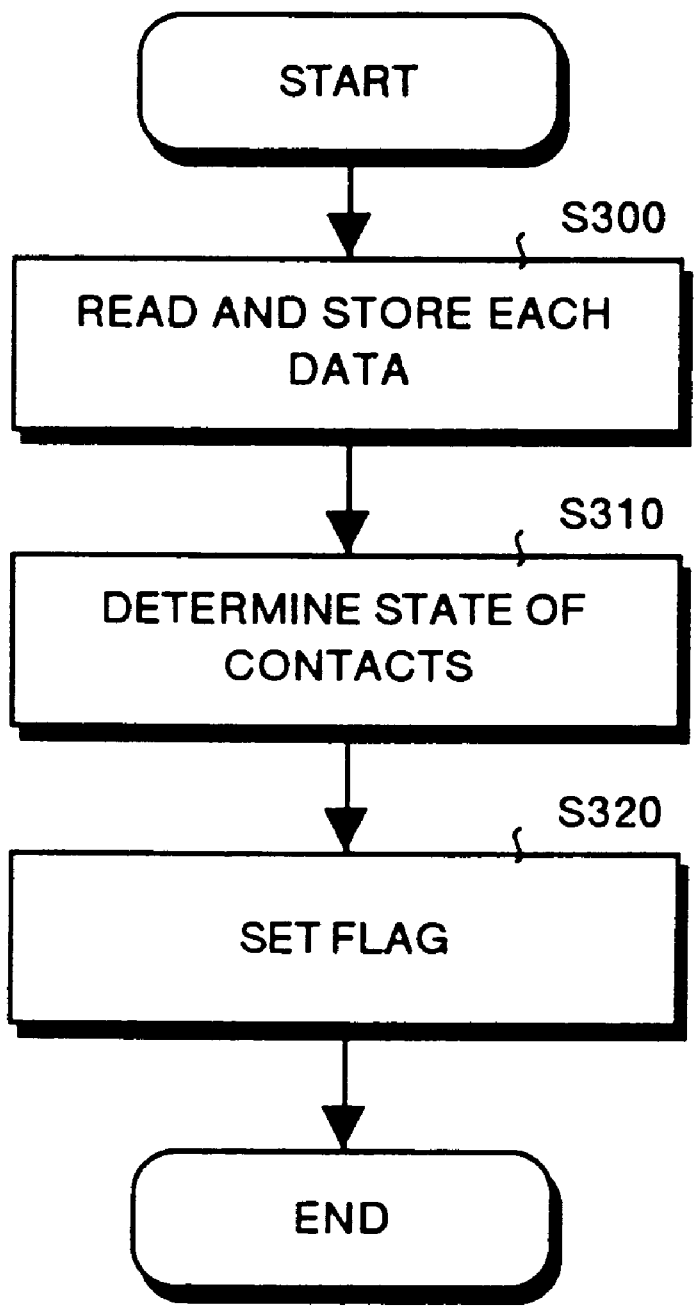
FIG. 6 is a flowchart showing a subroutine for mutual check in the operating state display processing.

Next description is made for an operation for displaying an abnormal state of the emergency shut-down switch with reference to FIG. 4 to FIG. 6. FIG. 4 is a view showing a flow of the processing for displaying an abnormal state of the emergency shut-down switch. In this processing flow, at first, system error checking is executed for each of the emergency shut-down switches 5, 6, 7 (step S100). This system error check is executed according to a subroutine for system error checking shown in FIG. 5.

In the subroutine for system error checking, mutual check for the contacts 5a, 5b of the emergency shut-down switch 5 (step S200), mutual check of the contacts 6a, 6b of the emergency shut-down switch 6 (step S210), and mutual check of the contacts 7a, 7b of the emergency shut-down switch 7 (step S220) are executed in this order.

The mutual check for contacts of each of the emergency shut-down switches 5 to 7 is executed according to the subroutine for mutual checking shown in FIG. 6.

In the subroutine for mutual checking, bit data for the corresponding photocouplers 61 to 66 is read and stored (step S300). This operation for reading the bit data is executed by reading bit data 61 χ, 62 χ for the photocouplers 61, 62 in the mutual check for the contacts 5a, 5b of the emergency shut-down switch 5, by reading bit data 63 χ, 64 χ for the photocouplers 63, 64 in the mutual check for the contacts 6a, 6b of the emergency shut-down switch 6, and by reading bit data 65 χ, 66 χ for the photocouplers 65, 66 in the mutual check for the contacts 7a, 7b of the emergency shut-down switch 7.

Then determination is made for a state of the contacts of each emergency shut-down switch according to the bit data for contacts of each of the emergency shut-down switches 5 to 7 read and stored as described above (step S310), and a contact flag (0, 1, 2) is set by software according to a result of determination of the state of each contact, and the value is stored in a memory (step S320).

It should be noted that the bit data 61 χ to 66 χ for the photocouplers 61 to 66 for determination of a state is "0" for a contact in the disconnected state, and "1" for a contact in the connected state. Also the contact flag is "0" for the normal state, "1" for an emergency shut-down state according to operation of any emergency shut-down switch, and "2" for contact fault (only one contact in the disconnected state). Determination for a contact state in the emergency shut-down switch 5 is executed as shown in Table 1, determination for contact state in the emergency shut-down switch 6 as shown in Table 2, and determination for a contact state in the emergency shut-down switch 7 as shown in Table 3.

TABLE 1

| 61 χ | 62 χ | State of Contact | Contact Flag |
| --- | --- | --- | --- |
| 0 | 0 | Emergency shut-down state | 1 |
| 0 | 1 | Contact fault | 2 |
| 1 | 0 | Contact fault | 2 |
| 1 | 1 | Normal | 0 |

TABLE 2

| 63 χ | 64 χ | State of Contact | Contact Flag |
| --- | --- | --- | --- |
| 0 | 0 | Emergency shut-down state | 1 |
| 0 | 1 | Contact fault | 2 |
| 1 | 0 | Contact fault | 2 |
| 1 | 1 | Normal | 0 |

TABLE 3

| 65 χ | 66 χ | State of Contact | Contact Flag |
| --- | --- | --- | --- |
| 0 | 0 | Emergency shut-down state | 1 |
| 0 | 1 | Contact fault | 2 |
| 1 | 0 | Contact fault | 2 |
| 1 | 1 | Normal | 0 |

As described above, when mutual check for contacts of each of the emergency shut-down switches 5 to 7 is complete, system control returns to step S120 in the flow chart in FIG. 4. In step S120, a contact flag is read, and determination is made as to whether any abnormality has been generated in the emergency shut-down circuit or not. Determination of any abnormality in this emergency shut-down circuit is made by making determination as to whether a value of the contact flag is "2" or not.

When, of the three contact flags, even one contact flag indicates "2", it is determined that any abnormality has been generated in the emergency shut-down circuit, and an alarm message is displayed in a display section 53 connected to the servo control section 8 to notice the operator of the fact (step S150). Contents of this alarm message is, for instance, "It seems that some abnormality has been generated in the emergency shut-down section on the operation panel. Check for any failure such as a short-circuitry of a switch or cable disconnection."

When none of the 3 contact flags indicates "2", determination is made as to whether emergency shut-down has been generated or not according to indication of the contact flags (step S130). This determination is executed according to the sequence shown in Table 4. A figure of "0" or "1" in the figure indicates a contact flag.

TABLE 4

| Emergency Shut-Down Switch | | | |
| --- | --- | --- | --- |
| 5 | 6 | 7 | Result of Determination |
| 0 | 0 | 0 | Normal |
| 0 | 0 | 1 | Teaching box shut down in an emergency |
| 0 | 1 | 0 | (This data format not allowable) |
| 0 | 1 | 1 | Operation panel shut down in an emergency |
| 1 | 0 | 0 | (This data format not allowable) |
| 1 | 0 | 1 | (This data format not allowable) |
| 1 | 1 | 0 | (This data format not allowable) |
| 1 | 1 | 1 | External device shut down in an emergency |

Data format in several rows in Table is "not allowable" for the following reasons. The contact flags are set according to signals from the photocouplers 61 to 66, and when, of the emergency shut-down switches arrayed in parallel to each other, one close to the power supply unit (Vdc), for instance, the emergency shut-down switch 5 is pressed, a current does not flow to any of components provided in the side closer to the ground as closer to the contacts 5a, 5b of the emergency shut-down switch 5, so that a current does not flow to the light-emitting side of all the photocouplers, and apparently it is equivalent to the case when all the emergency shut-down switches have been pressed.

One determination for emergency shut-down is made, an alarm message is displayed in the display section 53 connected to the servo control section 8 to notice the operator of the necessity (step S140). For instance the message of "Teaching box was shut down in an emergency" is displayed.

In this emergency shut-down apparatus, each of the emergency shut-down switches 5, 6, 7 has two contacts, and even if one of the 2 contacts is short-circuited, or even if a cable or the like connected thereto is broken, the emergency shut-down switch works effectively because of the other contact thereof, and it is possible for an operator to stop operation of the motor according to the operation's will, and further it is possible to detect generation of emergency shut-down or abnormality in the emergency shut-down circuit, and to alert it to related persons.

When any emergency shut-down switch close to the power supply unit, for instance, the emergency shut-down switch 5 is pressed, a current does not flow to any of components provided in the side closer to the ground as closer to the contacts 5*a*, 5*b* of the emergency shut-down switch 5, so that a current does not flow to the light-emitting side of all the photocouplers, and apparently it is equivalent to the case when all the emergency shut-down switches have been pressed.

Figure 7:
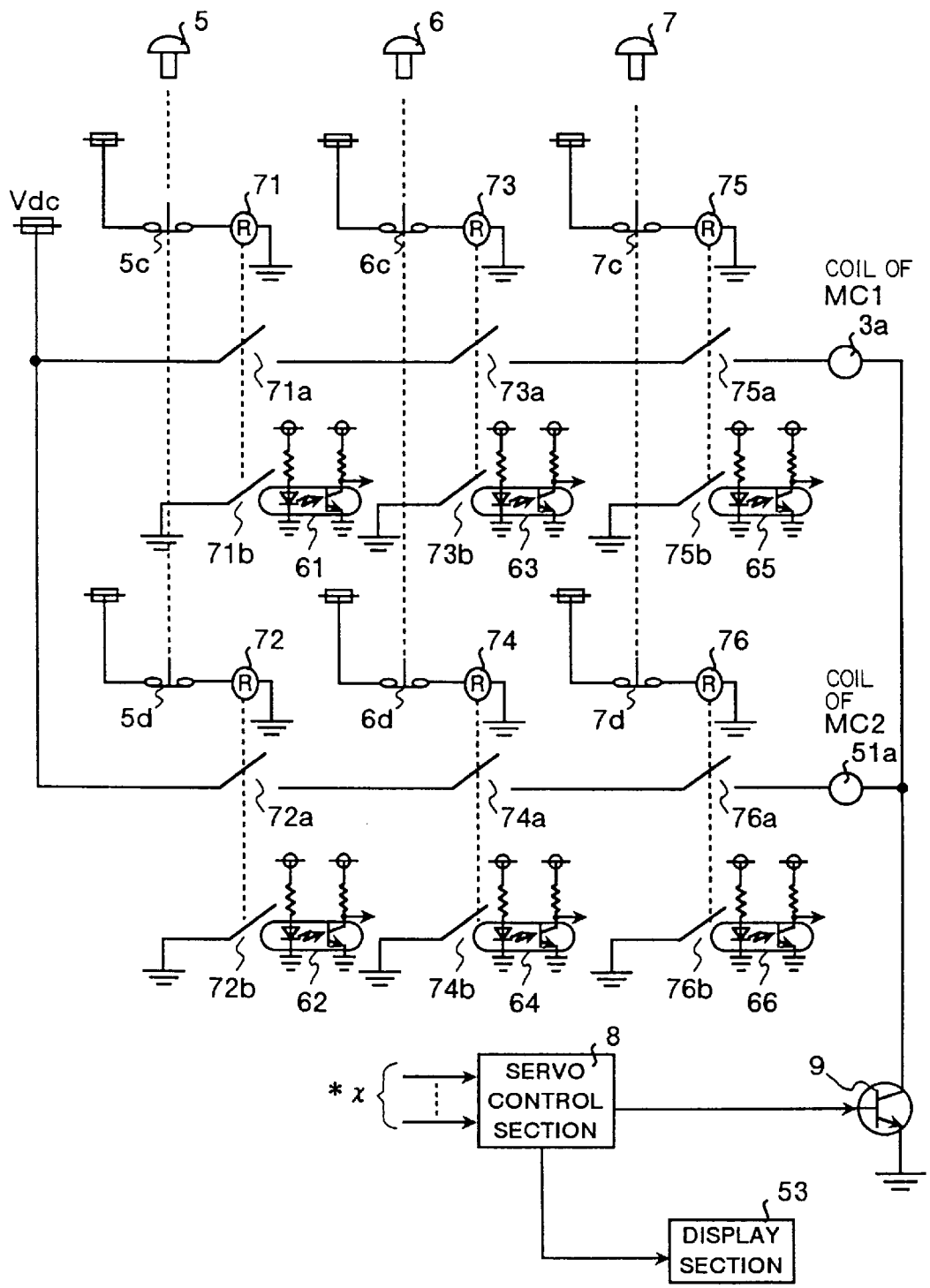
FIG. 7 is a view showing a coil power circuit in an electromagnetic contactor in an emergency shut-down apparatus for a motor according to Embodiment 3 of the present invention.

FIG. 7 is a view showing an emergency shut-down apparatus for a motor according to Embodiment 3 of the present invention. It should be noted that the same reference numerals are assigned to components corresponding to those shown in FIG. 2, and description thereof is omitted herein. Also as a power circuit for driving a motor according to this embodiment is the same as that shown in FIG. 2A, so that illustration thereof is omitted herein.

In Embodiment 3, the emergency shut-down switch 5 has contacts 5*c*, 5*d* arrayed in parallel to each other for controlling power supply to the relay switches 71, 72 connected in parallel to each other. An normally open contact A 71*a* of a relay switch 71 is provided in a power circuit for the coil 3*a* of the first electromagnetic contactor 3, another normally open contact A 71*b* of the relay switch 71 is provided in a power circuit for the photocoupler 61, an normally open contact A 72*a* of a relay switch 72 is provided in a power circuit for the coil 51*a* of the second electromagnetic contactor 51, and the other normally open contact A 72*b* of the relay switch 72 is provided in a power circuit for the photocoupler 62.

The emergency shut-down switch 6 has contacts 6*c*, 6*d* arrayed in parallel to each other for controlling power supply to relay switches 73, 74 arrayed in parallel to each other. An normally open contact A 73*a* of the relay switch 73 is provided in a power circuit for the coil 3*a* of the first electromagnetic contactor 3, the other normally open contact A 73*b* of the relay switch 73 is provided in a power circuit for the photocoupler 63, an normally open contact A 74*a* of the relay switch 74 is provided in a power circuit for the coil 51*a* of the second electromagnetic contactor 51, and the other normally open contact A 74*b* of the relay switch 74 is provided in a power circuit for the photocoupler 64.

The emergency shut-down switch 7 has contacts 7*c*, 7*d* arrayed in parallel to each other for controlling power supply to relay switches 75, 76 connected in parallel to each other. AN normally open contact A 75*a* of the relay switch 75 is provided in a power circuit for the coil 3*a* of the first electromagnetic contactor 3, the other normally open contact A 75*b* of the relay switch 75 is provided in a power circuit for the photocoupler 65, an normally open contact A 76*a* of the relay switch 76 is provided in a power circuit for the coil 51*a* of the second electromagnetic contactor 51, and the other normally open contact A 76*b* of the relay switch 76 is provided in a power circuit for the photocoupler 66.

In this embodiment, each contact of the emergency shut-down switches 5 to 7 operates independently, signals from contacts of relay switch 71 to 76 corresponding to the emergency shut-down switches 5 to 7 are not interfered by other signals, and the photocouplers 61 to 66 are connected in parallel to each other, so that power supply is controlled discretely according to disconnection or connection of contacts of the emergency shut-down switches 5 to 7.

With this feature of this embodiment 3, even when any emergency shut-down switch close to the power supply unit (Vdc), for instance, the emergency shut-down switch 5 is pressed, in determination of bit signals from the photocouplers 61 to 66, it never occurs that all the emergency shut-down switches closer to the ground as compared to the emergency shut-down switch 5 seem to have been pressed, which is better as compared to Embodiment 2.

It should be noted that, also in this Embodiment 3, the same effects and improvements as those in Embodiment 2 are provided also for other aspects.

Figure 8:
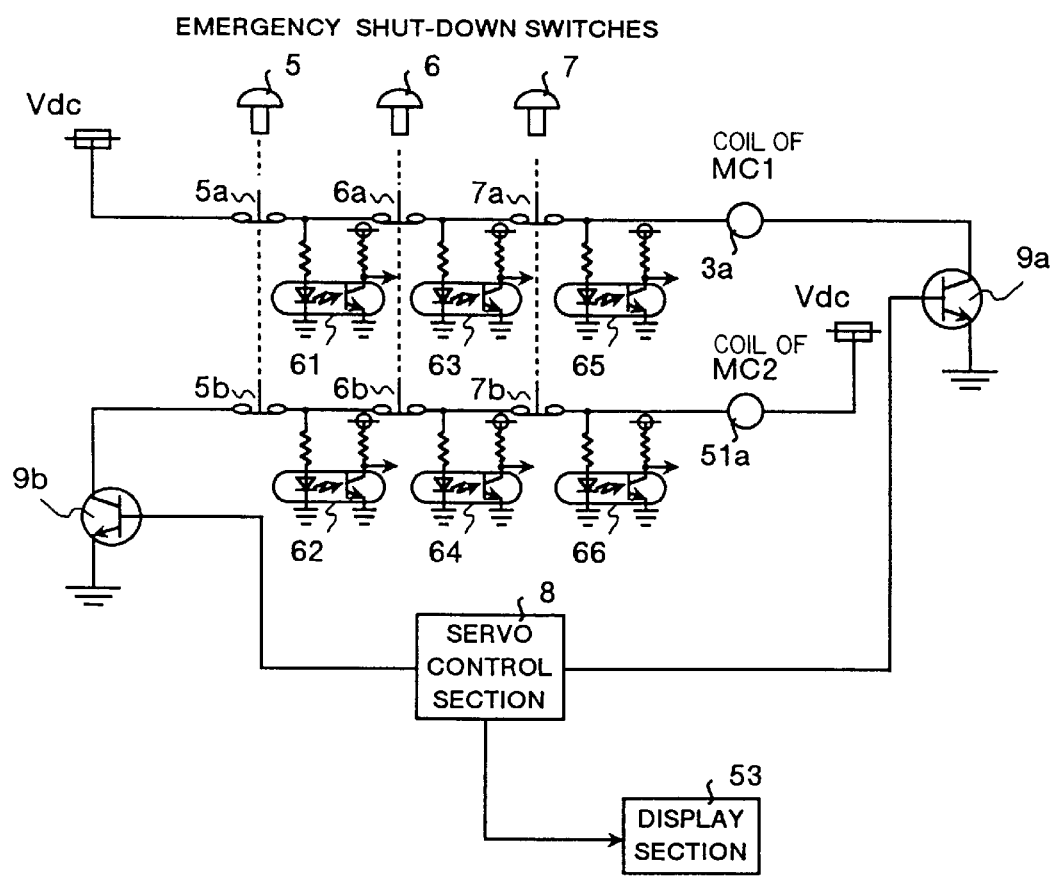
FIG. 8 is a view showing a coil power circuit for an electromagnetic contactor in an emergency shut-down apparatus for a motor according to Embodiment 4 of the present invention.

FIG. 8 is a view showing an emergency shut-down apparatus for a motor according to Embodiment 4 of the present invention. It should be noted that, in FIG. 8, the same reference numerals are assigned to components corresponding to those in FIG. 2, and description thereof is omitted herein. Also it should be noted that the power circuit for driving a motor according to this embodiment is the same as that shown in FIG. 2A, and illustration thereof is omitted herein.

In this embodiment, an emergency shut-down circuit comprising the contacts 5*a*, 6*a*, 7*a* and the coil 3*a* and an emergency shut-down circuit comprising the contacts 5*b*, 6*b*, 7*b* and the coil 51*a* are connected to the power supply unit (Vdc) in the reverse direction so that a DC current flows to the reverse directions in these emergency shut-down circuits, and switching transistors 9*a*, 9*b* are connected to the grounding side of the emergency shut-down circuits respectively. A base current for each of the switching transistors 9*a*, 9*b* is controlled by the servo control section 8 for synchronism so that the switching transistors 9*a* and 9*b* operate synchronously. The portions of the configuration other than those described above are the same as those in Embodiment 2.

With this feature, also in this Embodiment 4, the same effects and improvements as those in Embodiment 2 and obtained, and further in this Embodiment 4, a current is not supplied in the two emergency shut-down circuits in the same direction, but is flown in reverse directions, and a current always flows through the two contacts in the reverse directions respectively, so that a priority order for emergency shut-down among the contacts 5*a*, 6*a*, 7*a* of the emergency shut-down switches connected in series is contrary to that among the contacts 5*b*, 6*b*, 7*b* (highest priority in the emergency shut-down switch closest to the power supply unit), and reliability as an circuit becomes higher, which makes it possible to built an emergency shut-down circuit with higher reliability.

Figure 9:
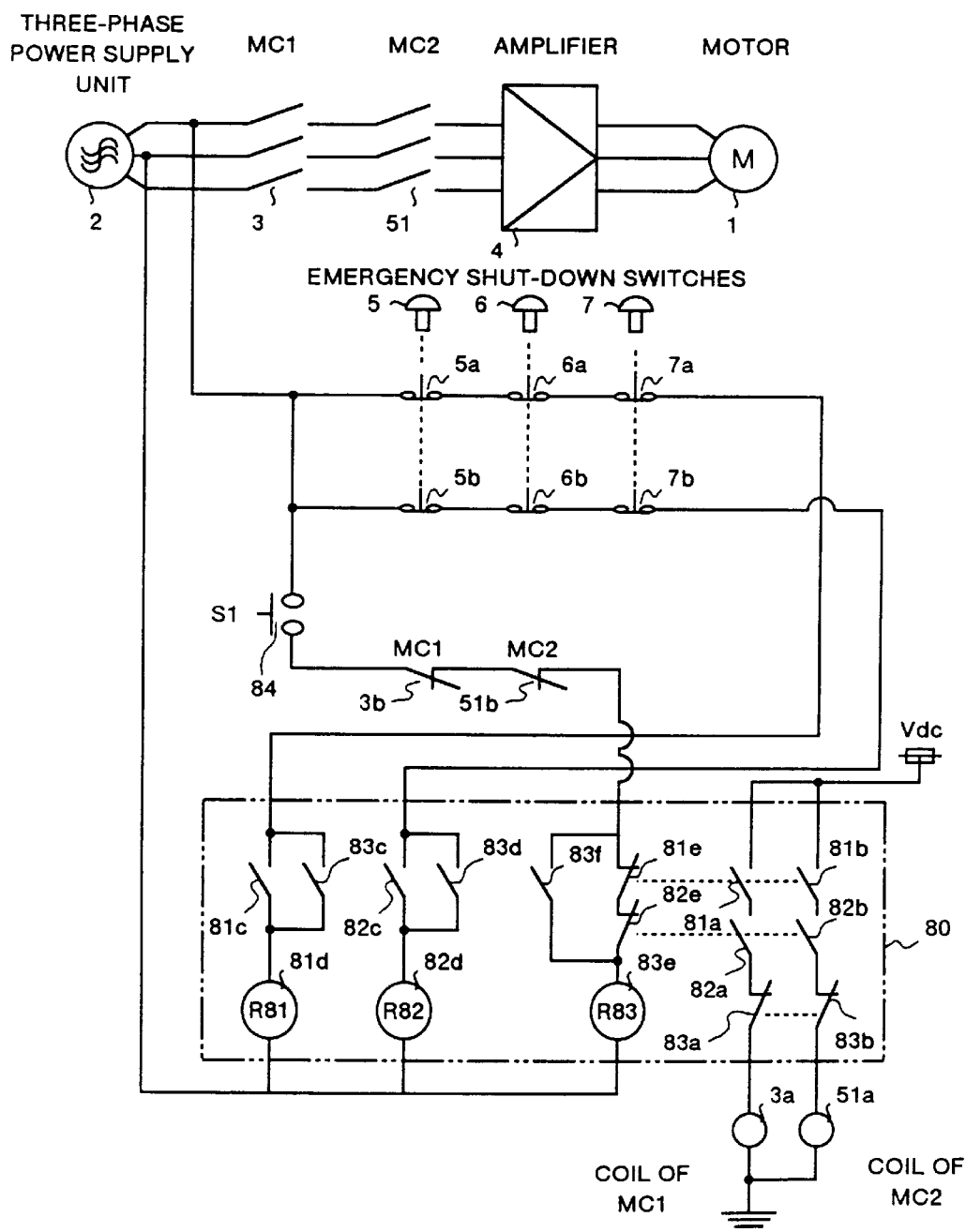
FIG. 9 is a view showing a coil power circuit for an electromagnetic contactor in an emergency shut-down for a motor according to Embodiment 5 of the present invention.

FIG. 9 is a view showing an emergency shut-down apparatus for a motor according to Embodiment 5 of the present invention. It should be noted that, in FIG. 9, the same reference numerals are assigned to components corresponding to those shown in FIG. 1 and description thereof is omitted herein.

In this embodiment, normally open contact A 81*a*, 82*a* of relay switches R81, R82 in a relay box 80 and an normally closed contact B 83*a* of the relay switch R83 also in the relay box 80 are connected in series to a power circuit for the coil 3*a* of the first electromagnetic contactor 3, and normally open contact A 81*b*, 82*b* of the relay switches R81, R82 in the relay box 80 and an normally closed contact B 83*b* of the relay switch R83 also in the relay box 80 are connected in series to a power circuit for the coil 5*a* of the second electromagnetic contactor 51.

A parallel circuit comprising the normally open contact 83c of the relay switch R83 in the relay box 80 and the normally open contact A 81c for self-sustaining of the relay switch R81 and a coil 81d of the relay switch R81 are connected to a circuit comprising the contacts 5a, 6a, 7a of the emergency shut-down switches 5 to 7, and a parallel circuit comprising the normally open contact A 83a of the relay switch R83 in the relay box 80 and the normally open contact A 82c for self-sustaining of the relay switch R82 and the coil 82d of the relay switch R82 are connected to a circuit comprising the contacts 5b, 6b, 7b of the emergency shut-down switches 5 to 7.

A momentary switch (S1) 84, the normally closed contact B 3b of the first electromagnetic contactor 3, the normally closed contact B 51b of the second electromagnetic contactor 51, normally closed contacts B 81e, 82e of the relay switches R81, R82, and an normally open contact A 83f for self-sustaining are connected to a power circuit for the coil 83e of the relay switch R83.

Figure 10:
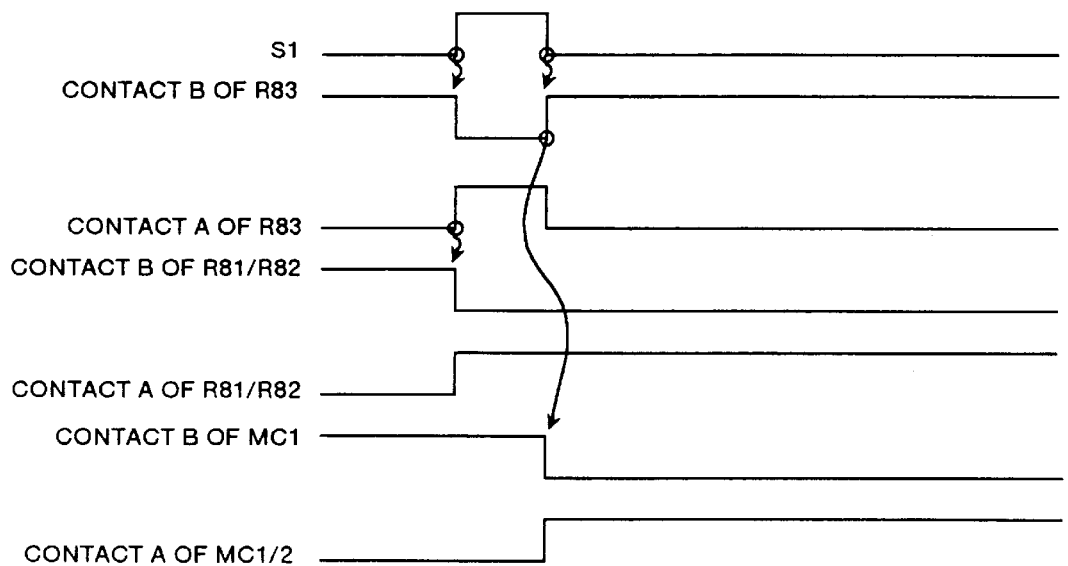
FIG. 10 is a timing chart showing timings for disconnecting or connecting each contact of the emergency shut-down apparatus for a motor according to Embodiment 5 of the present invention.
Figure 10:
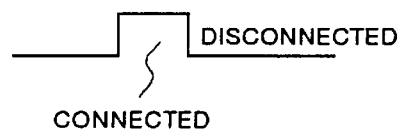

Next description is made for operations thereof with reference to the time chart shown in FIG. 10. When an operator presses the momentary switch 84 in the state where any of the emergency shut-down switches 5 to 7 has not been pressed down, a current flows via the normally closed contact B 3b of the first electromagnetic contactor 3, the normally closed contact B 51b of the second electromagnetic contactor 51, normally closed contacts B 81e, 82e of the relay switches R81, R82 to the coil 83e of the relay switch R83 with the relay switch R83 turned ON.

With this operation, the always-disconnected contacts A 83c to 83f of the relay switch R83 is switched from the disconnected state to the connected state with the normally closed contacts B 83a, 83b switched from the connected state to the disconnected state, a current flows to the coils 81d, 82d of the relay switches R81, R82 with the relay switches R81, R82 turned ON, while the normally open contacts A 81a to 81c, 82a to 82c of the relay switches R81, R82 are switched from the disconnected state to the connected state with the normally closed contacts B 81e, 82e switched from the connected state to the disconnected state.

When an operator releases the momentary switch 84, a current flowing to the coil 83e of the relay switch R83 is disconnected, so that the normally open contacts A 83c to 83f of the relay switch R83 are switched from the connected state to the disconnected state, while the normally closed contacts B 83a, 83b are switched from the disconnected state to the connected state, and a current flows to the coil 3a of the first electromagnetic contactor 3 as well as to the coil 51a of the second electromagnetic contactor 51, and both the first electromagnetic contactor 3 and second electromagnetic contactor 51 are switched from the disconnected state to the connected state. As a result, electric continuity between the three-phase power supply unit 2 and the amplifier 3 is established with a main circuit power voltage loaded to the motor 1, thus the motor 1 being driven.

As described above, in the state where a main circuit power voltage is being loaded to the motor 1, even if the operator again presses the momentary switch 84, as the normally closed contact B 3b of the first electromagnetic contactor 3 and normally closed contact B 51b of the second electromagnetic contactor 51 are in the disconnected state, the relay switch R83 is not turned ON, and no effect is given to operations of the relay box 80.

In the state as described above where the motor is being driven, if any of the emergency shut-down switches 5 to 7, for instance the emergency shut-down switch 5 is pressed, the contacts 5a and 5b are set in the disconnected state, power supply to the coils 81d, 82d of the relay switches R81, R82 is stopped with the normally open contacts A 81a to 81c and 82a to 82c of the relay switches R81 R82 are switched from the connected state to the disconnected state. With this operation, power supply to the coil 3a of the first electromagnetic contactor 3 as well as to the coil 51a of the second electromagnetic contactor 51 is stopped with both the first electromagnetic contactor 3 and second electromagnetic contactor 51 switched from the connected state to the disconnected state. With this operation, supply of a main circuit power to the motor 1 is shut down and operation for the motor 1 is stopped.

If either one of the contacts of any of the emergency shut-down switches 5, 6, 7, for instance, a contact 5a of the contacts of the emergency shut-down switch 5 is short-circuited, even if the emergency shut-down switch 5 is operated, the contact 5a is not set in the disconnected state, but the other contact 5b is set in the disconnected state, so that power supply to the coil 82d of the relay switch R82 is stopped with the normally open contacts A 82a to 82c of the relay switch R82 are switched from the connected state to the disconnected state.

With this feature, power supply to the coil 3a of the first electromagnetic contactor 3 as well a to the coil 51a of the second electromagnetic contactor 51 is stopped, and both the first electromagnetic contactor 3 and second electromagnetic contactor 51 are switched from the connected state to the disconnected state. With this operation, supply of a main circuit power to the motor 1 is shut down, and operation of the motor 1 is stopped.

In the faulty state of any emergency shut-down switch as described above, even if an operator again presses the momentary switch 84 without noticing any abnormal state, the relay switch R81 is kept ON and the normally open contact A 81a in the connected state, so that a current can not flow to the coil 83e of the relay switch R83. For this reason, the relay switch R83 is not turned ON, a current does not flow to the coil 82d of the relay switch R82, and the relay switch R82 is not turned ON, so that it is impossible to let a current flow to the coil 3a of the first electromagnetic contactor 3 and to the coil 51a of the second electromagnetic contactor 51.

Namely, once an abnormal state, where, for instance, either of the two contacts of an emergency shut-down switch is short-circuited, is generated in the emergency shut-down circuit, it become impossible to load a main circuit power voltage to the motor 1 again, which insures higher safety.

It should be noted that the relay box 80 may comprise a combination of discrete components, or may comprise one component called safety relay, but the function is as described above in either case.

In the emergency shut-down apparatus, each of the emergency shut-down switches 5, 6, 7 has two contacts, and even if one of the two contacts is short-circuited or a cable or the like connected thereto is broken, the emergency shut-down switch effectively works because of the other contact, and an operator can stop operation of a motor in an emergency according to the operator's will, and once any abnormality is generated in the emergency shut-down circuit, a main circuit power voltage is never loaded to the motor again, which insures higher safety.

Also the emergency shut-down circuit in the emergency shut-down apparatus for a motor is adapted to the contents of "one failure shall not cause disappearance of safety functions" described in Chapter 7 of European Safety Standards pr-EN954-1 "Safety of Machines—Portions Relating to Safety of a Control System—Part 1: Principles in Designing".

Figure 11:
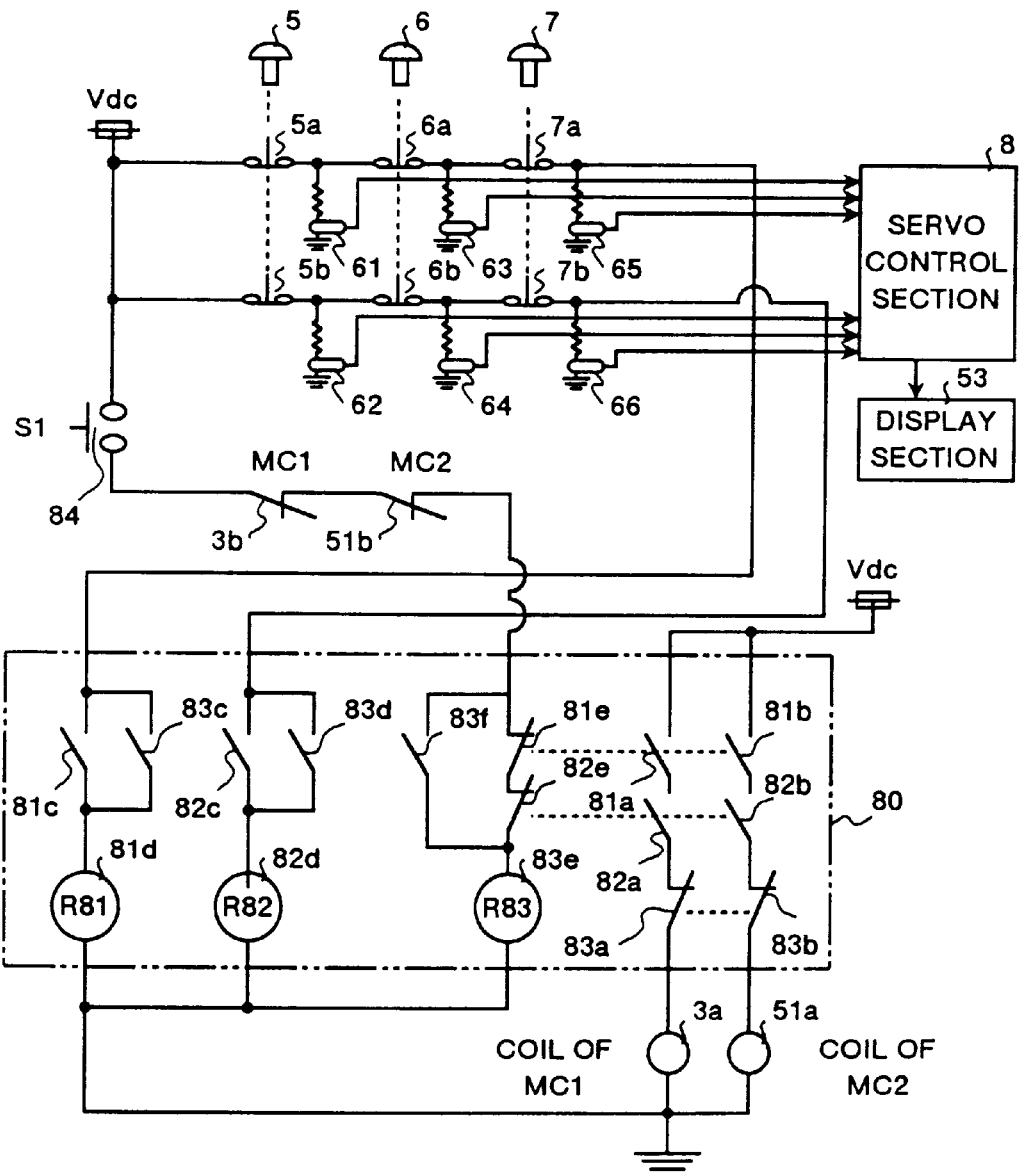
FIG. 11 is a view showing a coil power circuit for an electromagnetic contactor for an emergency shut-down apparatus for a motor according to Embodiment 6 of the present invention.

FIG. 11 is a view showing an emergency shut-down apparatus for a motor according to Embodiment 6 of the present invention. It should be noted that, in FIG. 11, the same reference numerals as those used in FIG. 2 and FIG. 9 are assigned to components corresponding to those shown in FIGS. 2A, 2B and FIG. 9, and description thereof is omitted herein. Also the power circuit for driving a motor in this embodiment is the same as that shown in FIG. 2A, and illustration as well as description thereof is omitted herein.

In this embodiment, the display function in Embodiment 2 is combined with that in Embodiment 5. It should be noted that a power for the emergency shut-down circuit is, like in Embodiment 2, a DC current flowing in two systems.

Namely, in configuration according to Embodiment 5, light-emitting elements of the photocouplers 61 to 66 for detecting whether each contact is in the disconnected state or in the connected state are connected in a branched form to the contacts 5a, 5b, 6a, 6b, 7a, 7b of the emergency shut-down switches 5, 6, 7. Signals from transistors in the light emitting sides of the photocoupler 61 to 66 are inputted into the servo control section 8, the servo control section 8 makes determination in which operating state the emergency shut-down switches 5, 6, 7 are, and a result of the determination is displayed in the display section 53.

Accordingly, in this embodiment, the emergency shut-down circuit works like in Embodiment 2, and even if one of the two contacts of any of the emergency shut-down switches 5, 6, 7 is short-circuited or a cable or the like connected thereto is broken, the emergency shut-down switch works effectively because of the other contact, an operator can stop operation of the motor according to the operator's will, and further once any abnormality is generated in the emergency shut-down circuit, a main circuit power voltage is never loaded to the motor again, so that higher safety is insured, and further it is possible to detect generation of emergency shut down or any abnormality in the emergency shut-down circuit and to alert it to related people.

Figure 12:
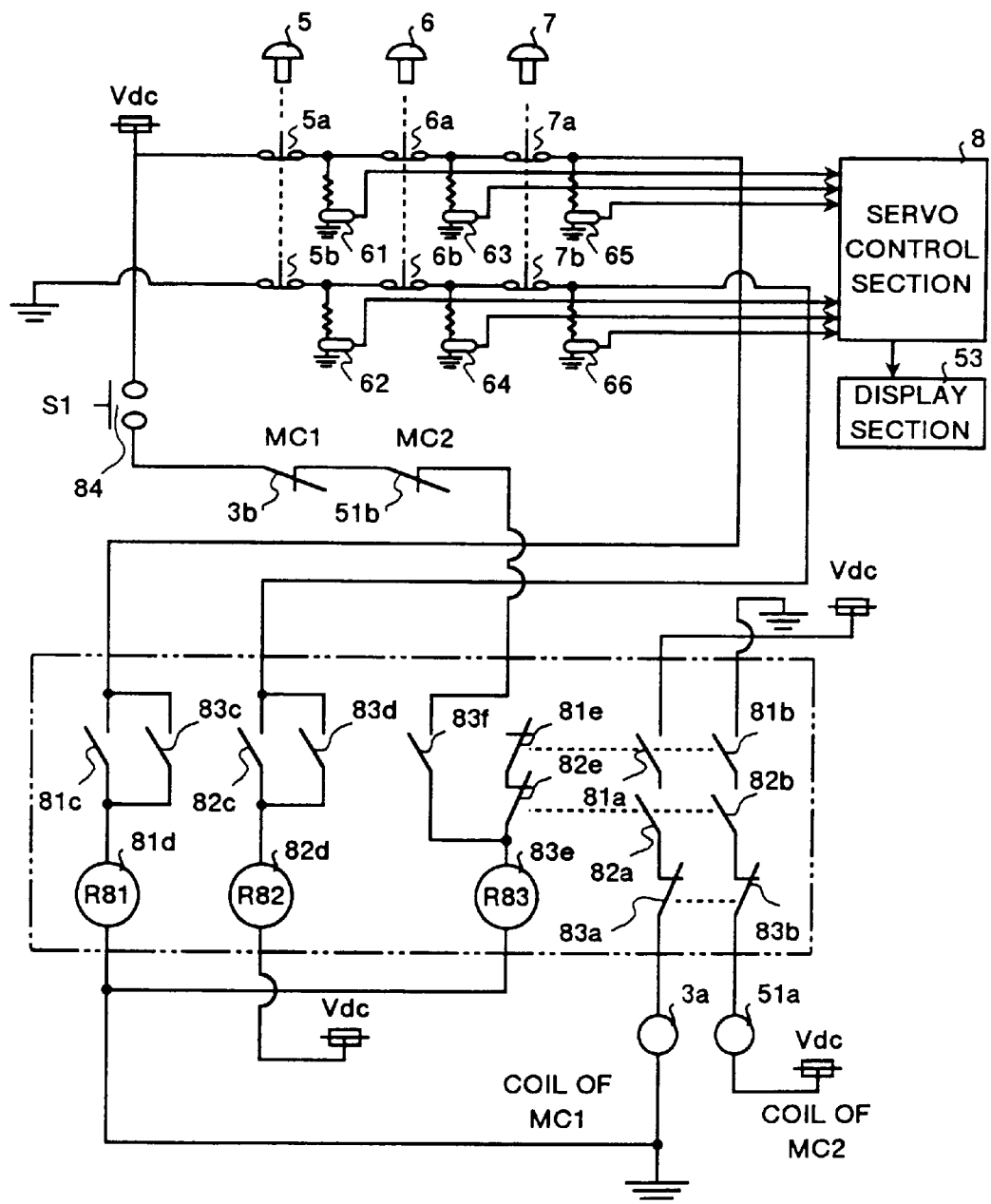
FIG. 12 is a view showing a coil power circuit for an electromagnetic contactor in an emergency shut-down apparatus for a motor according to Embodiment 7 of the present invention.
Figure 13A:
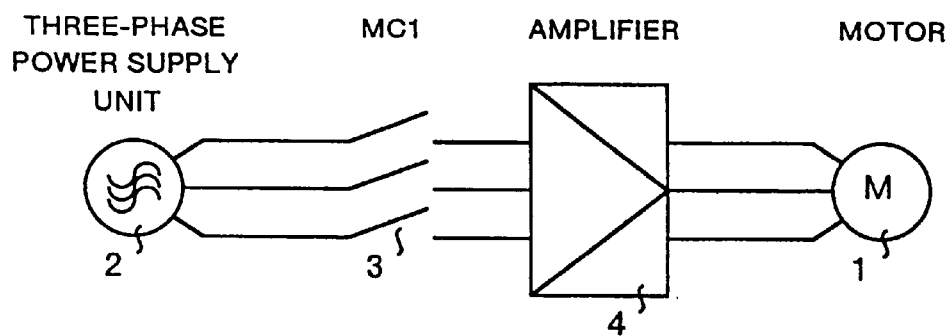
FIGS. 13A and 13B are circuit diagrams showing an emergency shut-down apparatus for a motor having the configuration as described in Example 1 of the conventional technology.
Figure 13B:
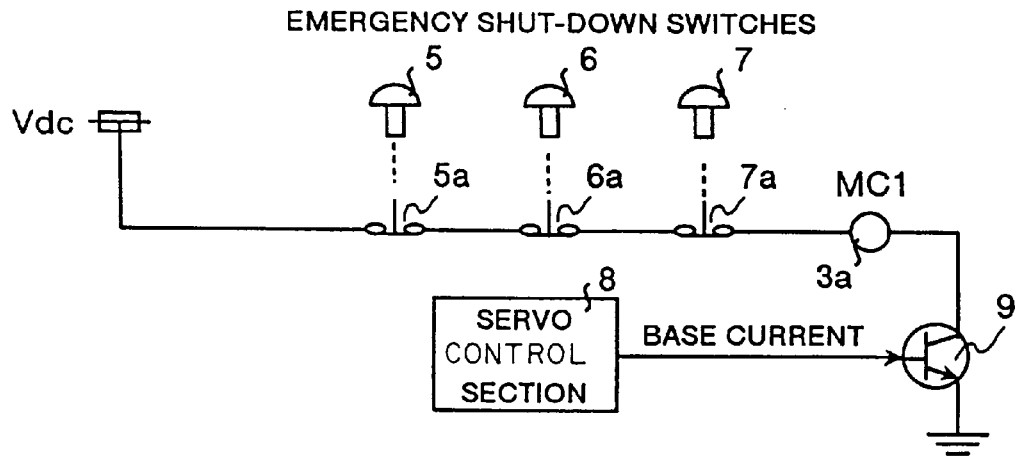
Figure 14:
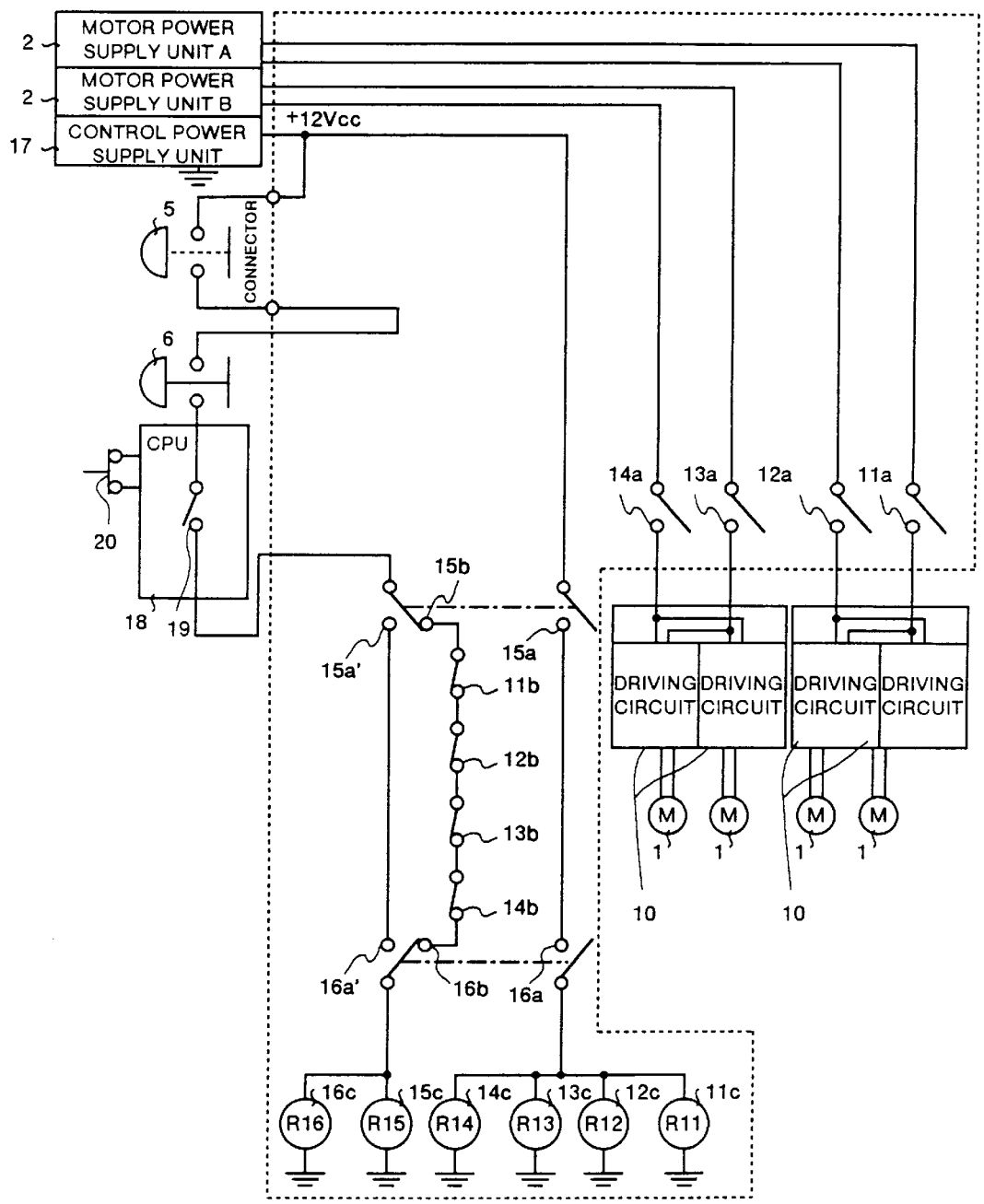
FIG. 14 is a circuit diagram showing an emergency shut-down apparatus for a motor having the configuration as described in Example 2 of the conventional technology.
Figure 15:
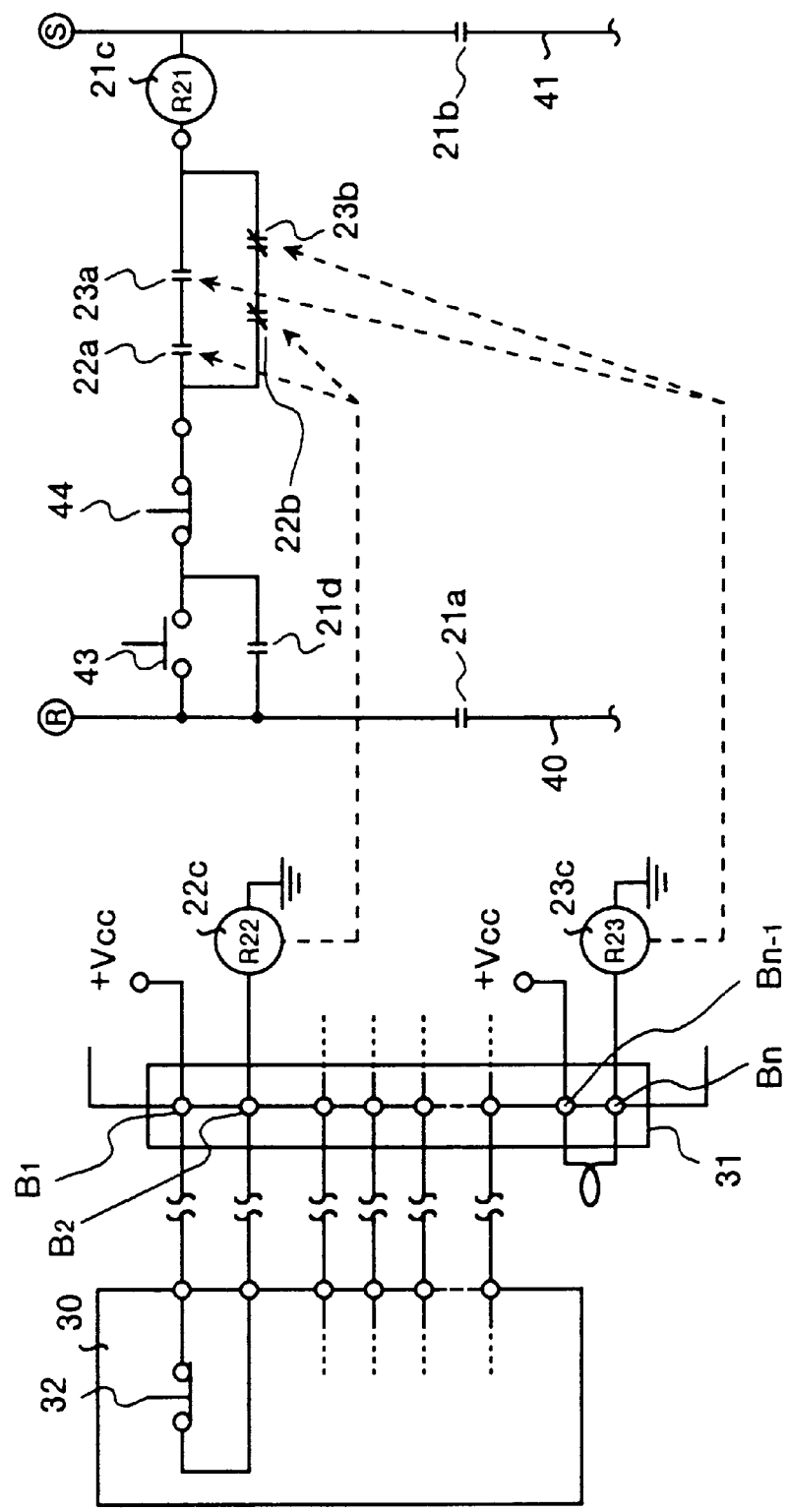
FIG. 15 is a circuit diagram showing an emergency shut-down apparatus having the configuration as described in Example 3 of the conventional technology.

FIG. 12 is a view showing an emergency shut-down apparatus for a motor according to Embodiment 7 of the present invention. It should be noted that the same reference numerals as those used in FIG. 8 and FIG. 9 are assigned to components corresponding to those in FIG. 8 and FIG. 9, and description thereof is omitted therein. Also the power circuit for driving a motor is the same as that shown in FIG. 2A, so that illustration thereof is omitted herein.

In this embodiment, the display function in Embodiment 2 is combined with that in Embodiment 5. As in Embodiment 4, an emergency shut-down circuit comprising the contacts 5a, 6a, 7a and the relay box 80 and an emergency shut-down circuit comprising the contact 5b, 6b, 7b and the relay box 80 are connected to the power supply unit (Vdc) for the circuits in the reverse direction so that a DC current flows through the circuits in the reverse directions respectively. Also a power circuit for the coil 3a of the first electromagnetic contactor 3 and a power circuit for the coil 51a of the second electromagnetic contactor 51 are connected to the power supply unit (Vdc) in the reverse directions so that a DC current flows through the circuits in the reverse directions respectively.

For the reasons as described above, in this embodiment, the emergency shut-down circuit effectively works like in Embodiment 5, and even if one of the two contacts of any of the emergency shut-down switches 5, 6, 7 is short-circuited or a cable of the like connected thereto is broken, the emergency shut-down switch works effectively because of the other contact, an operator can stop operation of the motor according to the operator's will, and further even if any abnormality is generated in the emergency shut-down circuit, a main circuit power voltage is never loaded to the motor again, so that higher safety is insured, further it is possible to detect generation of emergency shut-down or any abnormality in the emergency shut-down circuit and to alert it to related people, and still further different from the case where a current flows in two emergency shut-down circuits in the same direction, orders of contacts through which a current flow are contrary in the two system and a current always flow through the two contacts in the reverse directions, which insures higher reliability as a circuit and makes it possible to construct an emergency shut-down circuit with high reliability.

As understood from the description above, with the emergency shut-down apparatus for a motor according to the present invention, the emergency shut-down switch comprises a switch for a multiplexed circuit having a plurality of contacts arrayed in parallel to each other and working with the same phase of disconnection and connection, and a plurality of electromagnetic contactors each disconnected or connected according to disconnection or connection of each of said a plurality of emergency shut-down switches are connected in series to a main circuit power circuit for the motor, so that, even if one of the two contacts of an emergency shut-down switch is short-circuited or a cable or the like connected thereto is broken, the emergency shut-down switch works effectively because of the other contact, so that an operator can stop operation of the motor according to the operator's will.

With the emergency shut-down apparatus for a motor according to another aspect of the present invention, a relay switch circuit is connected to each of an emergency shut-down circuit including contacts of the emergency shut-down switches, and if one of the two contacts of an emergency shut-down switch is short-circuited, it is inhibited for the electromagnetic contactor to be set in the connected state again because of operations of the relay switch, so that, when any abnormality such as a failure is generated, a motor power voltage is never loaded to the motor again, which insures higher safety.

With the emergency shut-down apparatus for a motor according to another aspect of the invention, the relay switch circuit is one in which normally open contacts A of a relay switch turning ON or OFF according to operation of the momentary switch and a coil of a relay switch for controlling power supply to a coil of an electromagnetic contactor are connected in series to each of the emergency shut-down circuits including contacts of the emergency shut-down switches, normally open contact A of a relay switch having coils in the emergency shut-down circuits are connected in series to a power circuit for a coil of an electromagnetic contactor, and always-connected contacts B of a relay switch having coils n the emergency shut-down circuits are connected to a power circuit for a coil of a relay switch turning ON or OFF according to an operation of the momentary switch, so that it is inhibited for the electromagnetic contactor to be set in the connected state again because of operations of the relay switch circuit, so that a motor power voltage is never loaded to the motor again, which insures higher safety.

With the emergency shut-down apparatus for a motor according to another aspect of the present invention, determination is made as to whether a contact of an emergency shut-down switch is in the disconnected state or in the connected state according to an output signal from a contact disconnected/connected state detector provided in each of the contacts of the emergency shut-down switches, and a result of the determination is displayed in the display unit, so that it is possible to detect generation of emergency shut-down or any abnormality in the emergency shut-down circuit, and to alert it to related people.

With the emergency shut-down apparatus for a motor according to another aspect of the present invention, a current is flowing through two units of emergency shut-down circuits each having contacts of each emergency shut-down switch arrayed in series in the same direction, so that configuration of the power circuits is quite simple, and even if one of the two contacts of an emergency shut-down switch is short-circuited or a cable or the like connected thereto is broken, the emergency shut-down switch works effectively because of a circuit including the other contact, so that an operator can stop operation of the motor according to the operator's will.

With the emergency shut-down apparatus for a motor according to another aspect of the motor, a DC current flows in 2 units of emergency shut-down circuit each including contacts of the emergency shut-down switches in the reverse directions respectively, so that, different from the case where a current flows in two emergency shut-down circuits in the same direction, orders of contacts through which the current flows are reverse in the two circuits, and further a current flows through the two contacts of an emergency shut-down circuit always in the reverse directions, which insures higher reliability as a circuit and makes it possible to construct an emergency shut-down circuit with higher reliability.

With the emergency shut-down apparatus according to another aspect of the present invention, each of a plurality of emergency shut-down switches is constructed with a relay switch dependent on an independent power supply unit, an contact disconnected/connected state detector for each contact turns ON or OFF according to a state of a contact of this relay switch, and determination is made as to whether a contact of an emergency shut-down switch is in the disconnected state or in the connected state according to an output signal from this contact disconnected/connected state detector, so that, even if an emergency shut-down switch close to a power supply unit is pressed, it does not occur that all the emergency shut-down switches closer to the ground as compared to the pressed switch have apparently been pressed, and it is possible to accurately alert a section, where the emergency shut-down is generated, to related people.

This application is based on Japanese patent application No. HEI 9-271731 filed in the Japanese Patent Office on Oct. 3, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An emergency shut-down apparatus for a motor comprising:

an emergency shut-down switch comprising a plurality of contacts which are connected in parallel and which are synchronously opened and closed; and a plurality of electromagnetic contactors, connected in series between a main power circuit and the motor, are respectively opened and closed according to an open state or a closed state of each of said plurality of contacts of said emergency shut-down switch, wherein said electromagnetic contactors are set in an open state according to actuation of said emergency shut-down switch to stop supply of the main circuit power to the motor.

2. An emergency shut-down apparatus for a motor according to claim 1 comprising:

a contact state detector for detecting whether each contact of said emergency shut-down switch is open or closed; and a display unit for determining whether each contact of said emergency shut-down switch is open or closed according to an output signal from said contact state detector and displaying a result of the determination.

3. An emergency shut-down apparatus for a motor according to claim 1; further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in the same direction.

4. An emergency shut-down apparatus according to claim 1; further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in reverse directions respectively.

5. An emergency shut-down apparatus for a motor according to claim 1; wherein said emergency shut-down switch further comprises a plurality of relay switches supplied by another power circuit that is independent of said main power circuit, each relay switch connected to a corresponding contact of the emergency shut-down switch;

a contact state detector for detecting whether each contact of said emergency shut-down switch is in the opened state or in the closed state by determining a state of said relay switches, and a display unit for determining whether each contact of said emergency shut-down switch is in the open state or the closed state according to an output signal from said contact state detector and displaying a result of the determination.

6. An emergency shut-down apparatus for a motor according to claim 1; wherein a relay switch circuit is connected to each of said plurality of contacts of said emergency shut-down switch, and said relay switch circuit prevents supply of main circuit power where one of the contacts of said emergency shut-down switch is short-circuited.

7. An emergency shut-down apparatus for a motor according to claim 6 comprising:

a contact state detector provided at each contact for detecting whether a contact of said emergency shut-down switch is in the open state or the closed state, and a display unit for determining whether a contact of said emergency shut-down switch is in the open state or the closed state according to an output signal from said contact state detector and displaying a result of the determination.

8. An emergency shut-down apparatus for a motor according to claim 6 further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in the same direction.

9. An emergency shut-down apparatus according to claim 6; further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in reverse directions respectively.

10. An emergency shut-down apparatus for a motor according to claim 6; wherein said emergency shut-down switch further comprises:

a plurality of relay switches supplied by another power circuit that is independent of said main power circuit, each relay switch connected to a corresponding contact of the emergency shut-down switch;

a contact state detector for detecting whether each contact of said emergency shut-down switch is in the opened state or in the closed state by determining a state of said relay switches, and a display unit for determining whether each contact of said emergency shut-down switch is in the open state or the closed state according to an output signal from said contact state detector and displaying a result of the determination.

11. An emergency shut-down apparatus for a motor according to claim 6; wherein said relay switch circuit comprises a relay switch having a first normally open contact which opens and closes according to an operation of a momentary switch and a coil for controlling a power supply state to a coil of said electromagnetic contactor connected in series to the contacts of the emergency shut-down switch a second normally connect contact having a coil which is connected in series to a power circuit of the coil of said electromagnetic contactor, and normally closed contact having a coil which is connected to a power circuit of the coil of said replay switch which opens and closes according to an operation of said momentary switch.

12. An emergency shut-down apparatus for a motor according to claim 11 further comprising:

a contact state detector for detecting whether each contact of said emergency shut-down switch is in, and a display unit for determining whether each contact of said emergency shut-down switch is an open state or a closed state according to an output signal from said contact state detector and displaying a result of the determination.

13. An emergency shut-down apparatus for a motor according to claim 11; further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in the same direction.

14. An emergency shut-down apparatus according to claim 11; further comprising a plurality of emergency shut-down switches connected in series, wherein each emergency shut-down switch comprises a first contact connected to one of said electromagnetic contactors and a second contact connected to another one of said electromagnetic contactors so that a DC current flows through the first contact and the second contact in reverse directions respectively.

15. An emergency shut-down apparatus for a motor according to claim 11; wherein said emergency shut-down switch comprises a relay switch for supplying an independent power, a contact state detector which is turned on and off according to a state of a contact of said relay switch and for detecting whether each contact of said emergency shut-down switch is in the open state or in the closed state, and a display unit for determining whether a contact of said emergency shut-down switch is in the open state or in the closed state according to an output signal from said contact disconnected/connected state detector and displaying a result of the determination.

* * * * *